US006862573B2

(12) United States Patent
Kendall et al.

(10) Patent No.: US 6,862,573 B2
(45) Date of Patent: Mar. 1, 2005

(54) AUTOMATED TRANSACTION MANAGEMENT SYSTEM AND METHOD

(75) Inventors: John Kendall, Boulder, CO (US); Chris Phillips, Longmont, CO (US)

(73) Assignee: Clear Technology, Inc., Westminster, CO (US)

( * ) Notice: Subject to any disclaimer, the term of this patent is extended or adjusted under 35 U.S.C. 154(b) by 688 days.

(21) Appl. No.: 09/815,143

(22) Filed: Mar. 22, 2001

(65) Prior Publication Data

US 2002/0138449 A1 Sep. 26, 2002

(51) Int. Cl.[7] ............................................. G06F 17/60
(52) U.S. Cl. ..................... 705/7; 705/8; 705/9; 705/10
(58) Field of Search ...................................... 705/8–10

(56) References Cited

U.S. PATENT DOCUMENTS

| | | |
|---|---|---|
| 5,216,592 A | 6/1993 | Mann et al. |
| 5,235,507 A | 8/1993 | Sackler et al. |
| 5,530,861 A | 6/1996 | Diamant et al. |
| 5,535,322 A | 7/1996 | Hecht |
| 5,630,069 A | 5/1997 | Flores et al. |
| 5,764,923 A | 6/1998 | Tallman et al. |
| 5,870,711 A | 2/1999 | Huffman |
| 5,893,911 A * | 4/1999 | Piskiel et al. .................. 707/10 |
| 5,930,759 A | 7/1999 | Moore et al. |
| 5,950,169 A | 9/1999 | Borghesi et al. |
| 5,999,911 A | 12/1999 | Berg et al. |
| 6,003,011 A | 12/1999 | Sarin et al. |
| 6,041,306 A | 3/2000 | Du et al. |
| 6,058,413 A | 5/2000 | Flores et al. |
| 6,151,583 A | 11/2000 | Ohmura et al. |
| 6,230,201 B1 * | 5/2001 | Guck et al. .................. 709/228 |
| 2002/0016761 A1 * | 2/2002 | Foster et al. .................. 705/37 |
| 2002/0032636 A1 * | 3/2002 | Shields et al. ................. 705/37 |
| 2002/0059107 A1 * | 5/2002 | Reich et al. ................... 705/26 |
| 2002/0082881 A1 * | 6/2002 | Price et al. ..................... 705/7 |
| 2002/0161620 A1 * | 10/2002 | Hatanaka et al. ............. 705/10 |
| 2003/0018555 A1 * | 1/2003 | Callan et al. ................. 705/35 |
| 2003/0046665 A1 * | 3/2003 | Ilin ............................ 717/126 |
| 2003/0167219 A1 * | 9/2003 | Quraishi et al. .............. 705/36 |
| 2003/0208684 A1 * | 11/2003 | Camacho et al. ........... 713/186 |

FOREIGN PATENT DOCUMENTS

WO     WO 94/29804     * 12/1994     ........... G06F/15/21

OTHER PUBLICATIONS

Leite et al., "Business Rules as Organizational Policies", 1998 IEEE.*

* cited by examiner

Primary Examiner—James P. Trammell
Assistant Examiner—Jalatee Worjloh
(74) Attorney, Agent, or Firm—Reed Smith LLP; Harry K. Ahn

(57) ABSTRACT

An automated knowledge dependent transaction management system for processing both the front-end and back-end of a transaction is provided. The system contains hard-coded transaction management module to support the processing of deterministic manual work independent of the specific transactions. According to the invention, the hard-coded module is separated from the business logic that comprise the definition and configuration of the transaction specific data models, business rules and process steps which drive the manual work of human operators. Such separation of code and business logic allows any ordinary business administrator without any computer programming experience to quickly develop the business logic through a simple GUI. Further, any change in the business logic can be implemented quickly using the GUI by the ordinary administrator to accommodate changes in the business environment without relying on computer programmers.

34 Claims, 10 Drawing Sheets

|  | Data Collection Module | Case Management Automation Module | Decision Automation Module | Task Automation Module | Management Information Module |
|---|---|---|---|---|---|
| Dynamic Interface System | X |  |  |  | X |
| Process Control System |  | X | X | X | X |
| Rule Processing System | X | X | X |  | X |
| Data Control System | X | X | X | X | X |
| External Mapping System | X | X |  | X | X |
| Data Extraction System |  |  |  |  | X |
| Enterprise Administration System | X |  |  |  | X |

FIG. 4

AUTOMATED TRANSACTION MANAGEMENT SYSTEM AND METHOD

FIELD OF THE INVENTION

The present invention relates to data processing systems, and in particular to automated transaction management systems.

BACKGROUND INFORMATION

Over the years, huge resources were committed to developing rule-based technologies, ranging from stand alone inference engines and expert systems to development tools that allowed programmers to program business rules and processes into the existing system environments. These efforts included development of sophisticated workflow and routing applications, customer relationship management (CRM) and enterprise resource planning (ERP) systems for automating portions of business transactions. Moreover, many companies have developed proprietary applications based on hard-coded rules and process configurations.

Despite these automation efforts, many front and back office operations to process complex transactions in the services industry still rely greatly on human operators working with legacy systems. Manual work processes that have these same generic characteristics exist in the insurance industry (including policy underwriting and issuance and customer service), the telecommunications industry (service provisioning, contract and billing administration), the government (Social Security Benefits administration, Medicare and Medicaid eligibility and compliance), the utilities industries (service provisioning and product bundling) or the like. Even the new economy Internet companies such as amazon.com, yahoo.com, and priceline.com are building people-intensive service infrastructures to manually handle complex service transactions.

For example, to process automobile accident claims, an auto insurer relies on a large number of both the call center agents in the front office and claims management staff in the back office to take initial notice of loss details, establish a claims case file, generate data requests from various third parties, notify repairers and assessors, communicate with policyholders, wait for data inputs and outputs in both paper and electronic format and eventually hand the case over to experienced claims adjusters for resolution.

These agents must become skilled at navigating multiple, divergent legacy claims and policy administration systems. They must learn and apply complex business rules and processes outside of these systems which are frequently changing, handle infinite combinations and permutations of incident types and know their employer's many product and benefit entitlements intimately. And while managing these complex knowledge matrices, they must also remain tuned in to the needs of the policyholder who is usually distressed and wants clear affirmation and confidence in the resolution of their claim. At each step in the manual processing of these claims there is an opportunity for human error. Each error exposes the insurer to substantial losses, and the unnecessary additional administration costs that result from the rework required to resolve the error, not to mention the frustration of the policy holder.

Therefore, it can be appreciated that there is a significant need for an improved system and method for automating such manual processes in processing business transactions.

SUMMARY OF THE INVENTION

According to the principles of the present invention, there is provided an automated knowledge dependent transaction management system for processing both the front-end and back-end of a transaction to reduce human error, reduce labor costs and allow web-enablement of business transactions. An exemplary system includes a storage device that stores data of a customer transaction, business rules and business process steps. Each business rule has one or more deterministic outcomes based on evaluation of the stored data. The system also includes a transaction management module that collects as part of the front-end transaction the next data of the customer transaction that depends on the deterministic outcomes of the business rules associated with the data already collected. The transaction module further processes the back-end of the customer transaction by executing the tasks of the business process steps. The next business process step to be executed depends on the execution result of a current business process step.

As can be appreciated, because the transaction management system automates and integrates both the front-end and the back-end processing, and the business rules have non-inferential deterministic outcomes, the present invention processes transactions efficiently and substantially decreases the number of potential errors, resulting in substantial savings for the businesses.

BRIEF DESCRIPTION OF THE DRAWINGS

FIG. 4 is a table showing the components of FIG. 3 that are included in each module of FIG. 2.

DETAILED DESCRIPTION OF THE INVENTION

The manual work performed by human operators in conjunction with legacy administration systems can be delineated into deterministic knowledge work where there are clear consistent conclusions, and inferential knowledge work where the conclusions may differ depending on the judgments made by the operators. The present invention focuses on the rapid automation of manual work that is based predominantly on deterministic knowledge.

Deterministic knowledge dependent transactions (KDTs') are transactions that form the basis of the majority of manual work in industries, and in particular, service industries. These KDTs' rely on appropriate application of various business rules, case specific collection of predefined data sets and execution of predefined processes for accurate resolution. Typically, the business rules, data and processes in KDTs' change constantly from time to time. Examples of KDTs' include insurance claims, customer service, insurance policy underwriting, telecommunications provisioning, e-tailing customer service and problem resolution, Social Security benefit administration and eligibility, or the like.

At the front end, the present transaction management system uses tightly integrated rule processing and process control to deliver the transaction specific data set needed to process a KDT. This replicates the work that a human operator undertakes in the data collection phase of manual service work. The transaction management system then triggers the back end processing by executing process steps containing decision rule packages, task rule packages, and process rule packages to deliver the business outcome that will enable complete resolution and closure of the transaction. The present transaction management system also enables the back and front end processing to be electronically integrated into emerging web-based supply chains and business exchanges.

Specifically, the system contains the inbuilt, hard-coded, programmed functionality ("universal transaction automation framework") needed to support the common and complex requirements of processing deterministic manual work independent of the specific transaction. The universal transaction automation framework (containing programming codes) is separated from the business logic (comprising the definition and configuration of the transaction specific data models, business rules and process steps) that drives the manual work of human operators. One advantage of this separation of code and business logic is that the business logic can now be developed through a simple GUI (graphical user interface) outside of the programming code by any ordinary business administrator without any computer programming experience. A further advantage is that any change in the business logic can be implemented quickly using the GUI by the ordinary administrator to accommodate changes in the business environment without relying on computer programmers.

Figure 1:
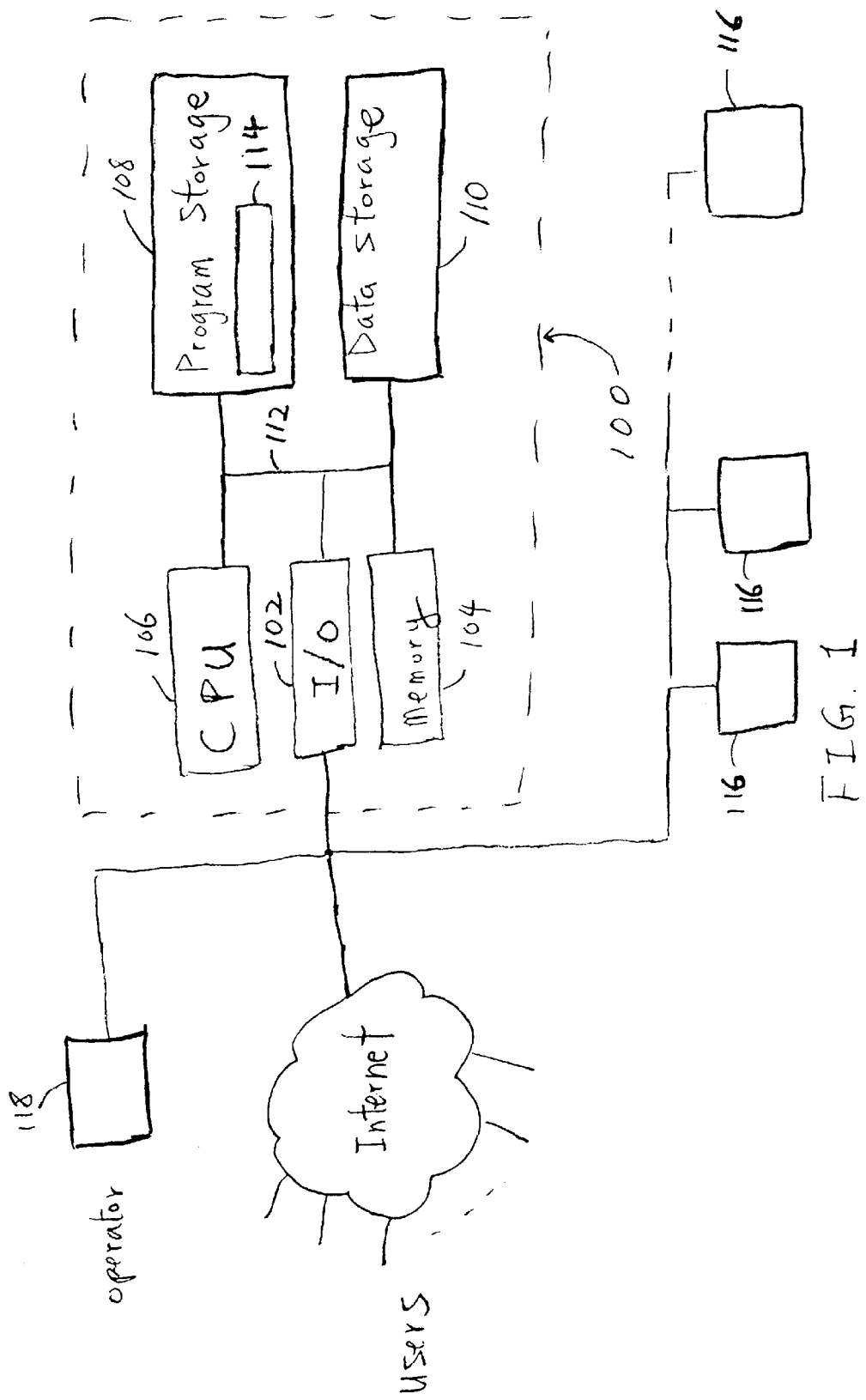
FIG. 1 is a functional block diagram of an automated transaction management system according to an exemplary embodiment of the present invention.

Referring now to FIG. 1, a transaction management system 100 of the present invention is an Internet-enabled application solution framework that automates KDTs'. The system 100 is a multitasking, real-time software technology that can simultaneously set up a transaction query, gather resolution data from internal and external sources, apply even the most complex client-specific business rules to the data, and put on hold or complete the transaction while simultaneously providing the user with continued and uninterrupted visibility of the ongoing automated processing of KDTs.

Different from existing sequentially driven automation technologies, the transaction management system 100 significantly reduces the time required to process business transactions by eliminating as much manual involvement as possible by using deterministic non-inferential rules which can be changed very easily according to changes in the business environment. At the same time, the system 100 navigates through numerous transaction gateways error-free with minimal, but controlled human intervention only when appropriate during the transaction.

As illustrated in FIG. 1, the transaction management system 100 is connected to the Internet through, for example, an I/O interface 102, such as for a LAN, WAN, fiber optic or cable link, which receives information from and sends information to Internet users and to one or more operators using a work station 118. The system is also connected to existing legacy systems 116.

The system 100 includes, for example, memory storage 104, processor (CPU) 106, program storage 108, and data storage 110, all commonly connected to each other through a bus 112. The program storage 108 stores, among others, a transaction management program or module 114. Any of the software program modules in the program storage 108 and data from the data storage 110 are transferred to the memory 104 as needed and is executed by the processor 106. The system 100 can be any computer such as a WINDOWS-based or UNIX-based personal computer, server, workstation or a mainframe, or a combination thereof. While the system 100 is illustrated as a single computer unit for purposes of clarity, persons of ordinary skill in the art will appreciate that the system may comprise a group of computers which can be scaled depending on the processing load and database size.

Figure 2:
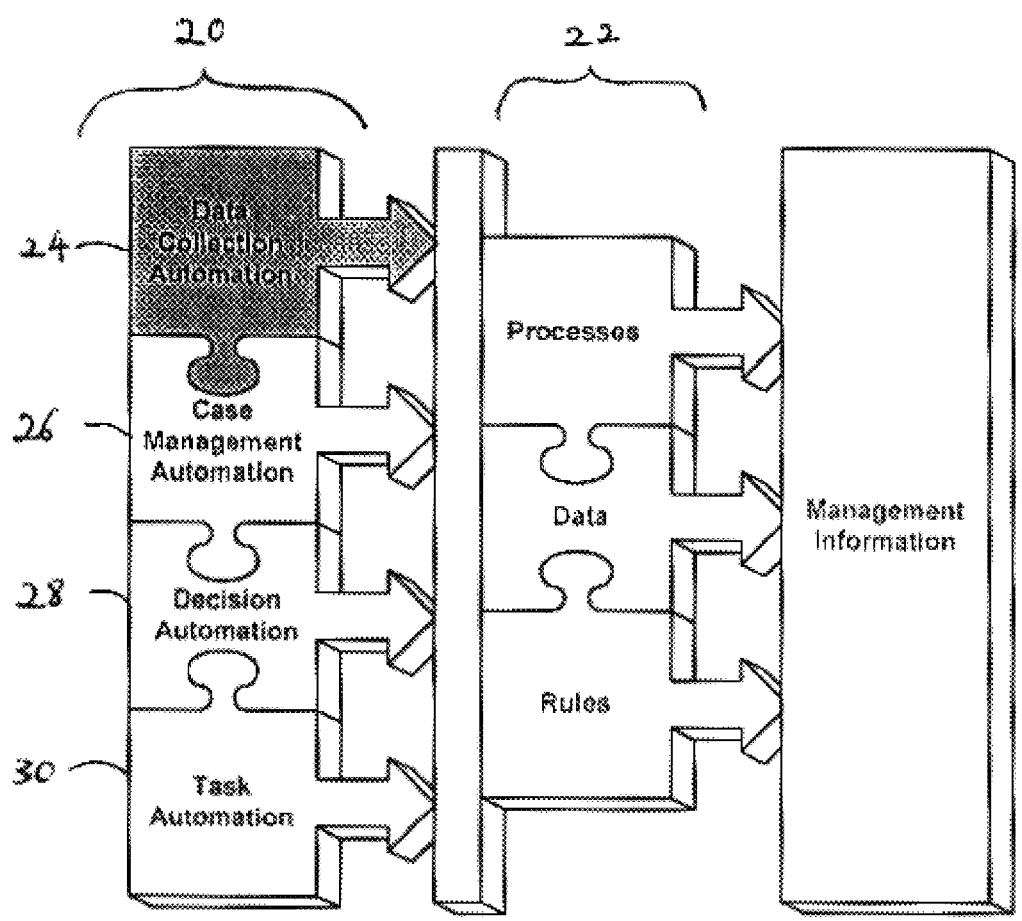
FIG. 2 illustrates a conceptual framework of the present invention.

FIG. 2 illustrates a conceptual framework of the present invention. An Industry Domain Knowledge ("Knowledge") 22 comprises business processes, data and rules that are used for executing an automated KDT.

The business process includes an automation process which is a sequence of automation steps to perform KDT automation. The different types of automation steps are organized into a logical sequence in which information is collected, managed, decided upon and acted upon. A process can be configured, enabling the business to update the automated KDT processing as quickly as changes in the business necessitate.

Data is the second type of Knowledge 22. The data for a KDT is divided into three basic types: case data, direct business data, and extended business data. The case data is the information that is collected and transacted against during KDT automation. Case data is defined by a case data profile, or smart case, which is the structure of the case data, created by logically grouping the data into virtual electronic "documents". Case data profiles also contain meta-data that provides attributes about the data elements beyond simple structural information. Each type of automation uses this meta data to perform various functions on the case. A data collection scenario collects data for multiple documents from a single source over a single medium. During a data collection interaction, users may be provided a script, which is defined in the data collection scenario and assists users through data collection. The invention uses the transaction resolution logic defined during a configuration and testing phase to dynamically create end-user GUI scripts for streamlined data collection and customized interaction based on the source of the data being collected and the type of data being collected.

The direct business data is information that is resident on external business systems and integrated into a case data profile as a document. Through a data map, data elements in the document are mapped to fields on the external business system.

The extended business data is information that is required to support KDT automation, but is not directly available and should be supplied and managed as part of the solution. This data is defined through an extended business data profile as will be discussed in detail later herein.

Rules, the third type of Knowledge 22, are constructed and applied in a number of different ways throughout the processing of KDTs'. The rules are made up of conditional "if-then-else" statements organized into logical packages and are executed together to provide a distinct business benefit. The rules used in KDT automation provide a deterministic package structure whereby each package is capable of decision making, action automation or scoring. One example of a rule that results in a decision is "if Estimated Damage>500 and Liable Party is Insured, Then Set Document Required: Repair Estimate".

The Knowledge 22 comprising data, rules and processes as well as the case data for individual transactions including external data are stored in the data storage 110 in a relational database format. Alternatively, the Knowledge can be stored in Extensible Markup Language (XML). The advantage of storing the data in XML is that such data can be shared across branch offices of a company regardless of what legacy system each branch may employ. For example, rules and processes defined in one branch office can be shared with another branch that might have a different legacy system such that modeling a slightly different type of transaction can be done very rapidly since most modeling was done at another branch.

The Knowledge 22 comprising the above data, rules and processes is used by a transaction management module 20 of the system to automate the KDT. The transaction management module 20 comprises data collection automation 24, case management 26, decision 28, and task automation 30 modules.

The data collection automation module 24 collects the correct information during a given interaction with a data source. Business rules determine what data is required for a given circumstance and how the information is collected. The primary goal for the module 24 is to gather and validate the proper information as efficiently as possible based on the specific circumstances of the case.

The case management automation module 26 tracks and manages the state of the case—what information is collected and what information is still required. Business rules use the currently available data to decide what, if any, additional information is required to act on the KDT. If more information is required, the "smart case" profiling indicates how to request the information and how long to wait for the data to arrive. A defined automation process controls the order of case-state evaluation and request processing.

The case management automation module 26 performs automation in four stages: evaluating the data elements collected, setting up the case for remaining required information, issuing requests for missing data elements, and waiting for information to arrive. As new data elements arrive via data collection, the case is re-evaluated and the cycle begins again. Once all of the data elements are collected for a specific decision and action process, a message is sent for final decision and action execution. If these data elements are not received within a certain time frame as determined by the smart case profile, additional automated requests are made or the case is routed for manual intervention. Once it is determined during case management automation that a case is complete and all required data elements have been captured for a specific process, a message is received to make a decision. Each KDT may have several defined processes that together provide the automation of the necessary business decisions.

The decision automation module 28 uses business rules to make business decisions while using a process to control the order in which decisions are made. Decisions automated during decision automation may provide input information to the case for which the case management automation module is waiting.

The task automation module 30 performs automated processes that replace tasks normally performed manually. For instance, a task automation step may consist of a set of complex mainframe interactions normally performed by a case worker. A task automation step may provide information for a case that is waiting at the case management automation step to be completed.

The Management Information module in FIG. 2 aggregates and analyzes case data, transaction history and rule results to provide detailed and summary information to management, enabling visibility of the end-to-end KDT automation process. Importantly, it provides the key analysis data that can be used to drive and constantly improve the management of data, rules and processes.

Figure 3:
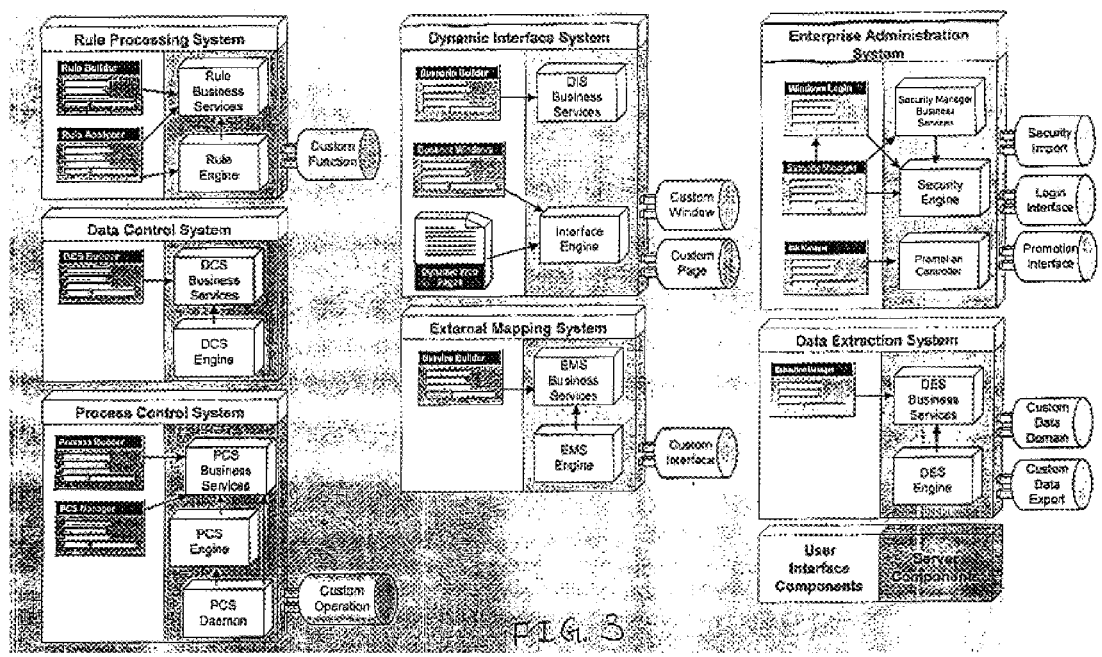
FIG. 3 illustrates a detailed diagram of various functional components of an exemplary software architecture of the present invention.

FIG. 3 illustrates a component based interconnected system that represents an exemplary software architecture of the present invention. The transaction automation program 114 is divided into several separate functional modules or systems where each module may be developed independently as a separate system.

A Data Control System (DCS) supplies services to define smart case profiling and control data retrieval and storage for KDT automation, and provides services to define and maintain extended business data as well as map the direct business data to external system requests. Within the Data Control System, a DCS builder is a graphical interface that allows an analyst to enter document profiles, sections and elements that comprise a case profile. A DCS Business Services subsystem provides other systems with the ability to access DCS data without having to know the underlying database structure. A DCS Engine controls storage, retrieval and modifications to the case data.

A Rule Processing System (RPS) performs rule processing for the automation modules and provides services to define and maintain rules, analyze rule results and test new rules. Furthermore, it provides visibility of individual rule execution paths, enabling full graphical viewing of a given decision. Within the RPS, a Rule Builder is a primary graphical interface to create and maintain rules. Rules are presented in a tree structure with True/False results that are easy to follow as will be discussed in detail later herein with reference to FIG. 5. Rule packages and result sets, which are also discussed in detail later herein with reference to FIG. 6, are managed graphically as well. A Rule Analyzer is a graphical analysis tool that measures previous rule results, and provides cross sectional analysis of rule results and package results.

A Rule Engine executes rules for a given activity while a Rule Business Services interface provides a series of classes that wrap up multiple database interactions and data manipulations into single transactions for use by the Rule Builder and RPS Engine. A Custom Function plug-in interface allows user-defined functions that can be used in rule conditional expressions.

A Process Control System (PCS) furnishes services that control process activity across the automation process including the ability to execute offline, real-time operations in a controlled sequence. Within the PCS, a Process Builder is a graphical interface that is used to define and maintain processes, process steps and step transitions. In one embodiment, it includes a graphical front-end application to allow an analyst to crate processes using a flowcharting tool such as Visio. Each process step and transition can be created or edited using simple mouse clicks. For example, a transition between two process steps can be created by pointing to a source process step and dragging a mouse to a destination process step. At that point, the process builder brings up a transition properties screen for defining that transition by the user.

A PCS Manager is a graphical interface that allows a system administrator to view, configure and control the system run-time environment. In addition, it allows servers to be defined, process steps to be assigned to servers, threads to be defined for a process step/server configuration, and display of number of queued items, active threads and process rate and errors. A PCS Business Services interface provides for transactional updates during process definition.

A PCS Engine controls the flow of documents through a process and executes process step logic and puts a document in the next step's queue. A PCS Daemon monitors process step queues and starts process step executions when an eligible document is selected. A Custom Operation plug-in provides the ability to create business specific behavior that is not offered directly by the system 100. An example could be an operation that provides pre-processing of information before rules are executed.

Still referring to FIG. 3, a Dynamic Interface System (DIS) provides services for scripted, dynamic end-user interactions that are the primary interface for the data collection automation module 24, and supplies services to define and maintain scripts that guide the data collection activity. Within the DIS, a Scenario Builder allows a business administrator who may have no programming knowledge to graphically define case data collection scenarios which are used to provide direct phone call scripting or data entry guidance. A scenario can be used, for example, by a call center and typically defines a data collection session for a customer transaction such as what documents or information should be collected, in what order, how should the customer be guided through data collection and what access to the data the customer should have.

Scenarios can be linked to perform a seamless transition from one scenario to another. The target scenario is selected according to the data collected so far. Linking is performed by using a decision rule package (rule packages are described in detail later herein). A decision rule package is associated with the scenario that is being linked from and each decision from the rule package is associated with a scenario to be transitioned to. This way, a single scenario can transition to any number of other scenarios depending on a set of rules defined in the rule packages.

Figure 9:
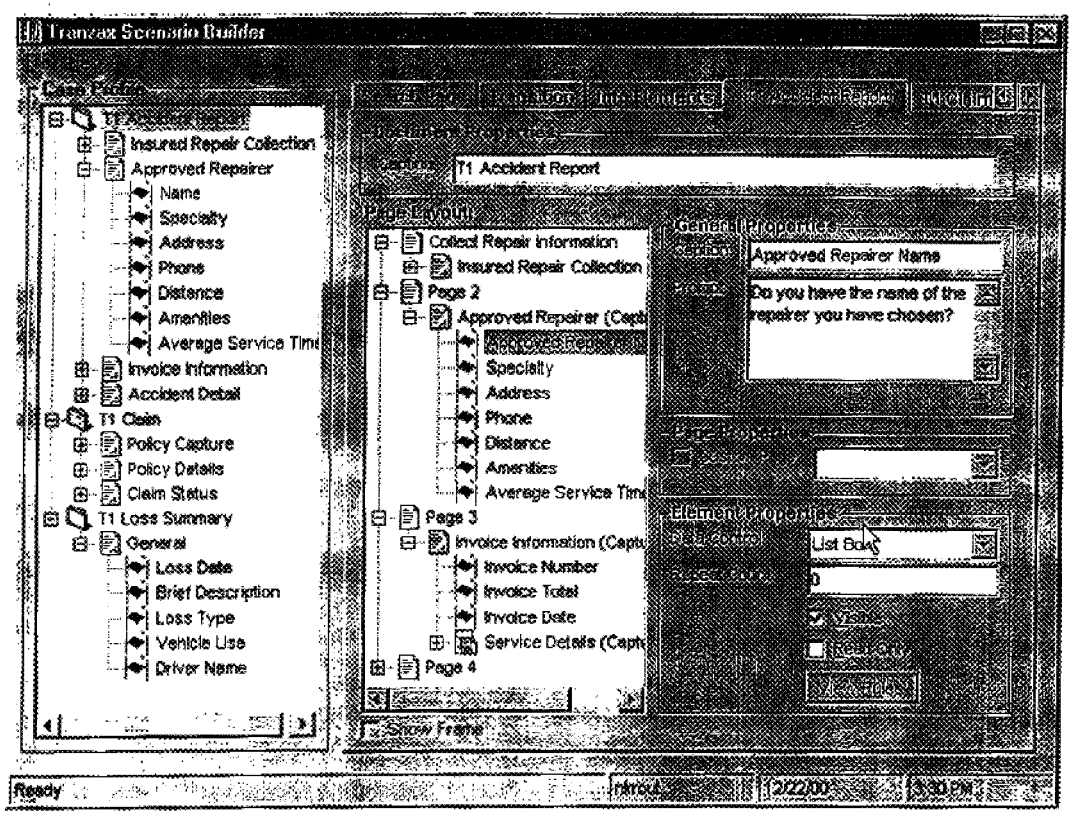
FIG. 9 is an exemplary screen shot of a scenario builder according to the present invention.

FIG. 9 is an exemplary screen shot of a scenario builder that illustrates how any business administrator with no programming knowledge can build scenarios. A scenario may comprise chapters, pages, sections and elements. A chapter is a logical grouping of data in a scenario. Each chapter includes one or more pages of data. Each page includes one or more sections and each section includes one or more data elements. In FIG. 9, "T1 Accident Report" is a chapter, "Page 2" is a page, "Approved Repairer" is a section, and "Approved Repairer Name" and "Specialty" are elements.

As shown, the element "Approved Repairer Name" is highlighted. The business administrator creating the scenario has set up the scenario such that when an agent is about to collect that information, a prompt script of "Do you have the name of the repairer you have chosen?" is displayed on the agent's screen.

Tabs in FIG. 9 such as "Search Page" "Transition" and "Info Elements" allow the business administrator to navigate through various parts of the scenario to be built. Briefly, the Search Page tab allows the user to set up an initial search page for locating an existing case. The Transition tab is where transitions to other scenarios using decision rule packages are defined. The Info Elements tab allows a set of information elements to be displayed in a portion of the case agent's display during data collection.

A Dynamic Windows is a primary interface for the data collection module 24 in a Windows environment. Windows are dynamically generated based on a case profile and collection scenario. Similarly, a Dynamic Web Pages is a primary interface for the data collection engine in a Web environment. Web pages are dynamically generated based on a case profile and collection scenario. Both interfaces use an Interface Engine to determine the next page or window during data collection either through a live operator or the Internet.

A DIS Business Services subsystem provides for transactional logic and an interface to DIS data for other systems as needed. A DIS Interface Engine interacts with Rule Processing and Data Control Systems to determine what information should be collected. This determines the "next" window or page during data collection. A Custom Window/Page plug-ins' enables customization for a specific look and feel in both the Windows and Web environments, and overrides generation of dynamic window or page. They facilitates additional functionalities that are not directly provided by the Dynamic Windows and Dynamic Web pages interfaces.

An External Mapping System (EMS) provides services to define and execute external system requests, mapping input and output data for each request. In the EMS, a Service Builder defines available external system services such as "Lookup Member" or "Pay claim". It maps business structures as defined in Data Control to the external system requests inputs and outputs and maps system requests to interface plug-in parameters. An EMS Business Services interface provides for transactional updates during service configuration. An EMS Engine executes requests to external systems by any of the Systems in FIG. 3 and interacts with an external system by calling the plug-in defined by an EMS service. A Custom Interface plug-in provides the ability to create a custom interface to communicate with an external system. Examples may be a terminal emulator plug-in that performs table driven screen scraping or a simulation plug-in that simulates any external system request by simply mapping given inputs to known outputs.

A Data Extraction System (DES) furnishes services that define and extract data views across case data, business data, transaction history and rule-processing results. In the DES, an Extraction Manager is a graphical interface that allows a user to define and maintain extract profiles and allows extract profiles to be executed by a user. A DES Business Services provides for transactional updates during extract profile definition. A DES Engine is a Middle-tier component that executes extract profiles, allows extracts to be executed from the Execution Manager and allows extracts to be executed unattended in a "batch" mode. A Custom Data Domain plug-in interface allows custom data domains to be defined while a Custom Data Export plug-in interface allows custom output formats to be defined.

An Enterprise Administration System (EAS) supplies security services for the automation engines and provides a common audit trail mechanism. It also provides services to control administrative system concurrency through a logical access locking mechanism. Within the EAS, a Windows Login interface includes an ActiveX component that controls the login for each of the program's user interface applications. A Security Manager is a front end application that provides a system administrator with the ability to maintain users, user groups and to assign security rights to groups. An IDK Manager is a graphical interface that provides a uniform interface to gain access to "builder" components to maintain industry domain knowledge 22.

A Security Manager Business Services interface provides for transactional updates during user definition and security maintenance. A Security Engine processes all security requests while a Promotion Controller is a Middle-tier component that controls the verification and sequencing of the promotion of IDK data and structures from a source to target zone. The Promotion Controller uses promotion interface plug-ins to execute a promotion. A Security Import plug-in allows SAS to connect to an external security system and load user security details. A Login Interface plug-in provide the ability to validate a user login and provide login information to the Windows Login component. The Promotion Interface plug-in is an interface that promoter plug-ins implement to perform the promotion of data and structure in the promoter's domain. Each of the systems in FIG. 3 should create a promoter plug-in that implements this interface to be able to promote its data across zones.

The various systems in FIG. 3 are shared by the modules of FIG. 2 as shown in FIG. 4. For example, the Rule Processing System is shared among the Data Collection 24, Case Management Automation 26, Decision Automation 28 and Management Information modules.

Data

As a step in configuring the system, a business user or administrator uses a document builder in the Data Control System to build a case profile that defines the data to be collected during a transaction. There are two types of data: data used in a rule execution, and data used to complete a transaction.

The case profile defines a set of data containers that hold all of the data required to process a case. The data containers include documents, sections, and elements. Documents are the highest-level containers of information. Documents contain logically independent sets of data for a case. For example, an accident report from the insured and a third party report would each be documents. Each document type (called a document profile) can be associated with a process that will be performed on the document after it has been collected.

Sections are smaller logical containers of information. They contain sets of data that can be logically grouped together, and are generally used to make the data in a document more coherent. For instance, the insured's personal information would be one section of an accident report, while the details of the damage to the car would be another. Sections are composed of elements.

Elements are the smallest containers of data. They hold individual pieces of data such as the insured's name, the date of an accident, or the amount charged by a repairer for each item in an itemized list. Each of these containers can be marked as "repetition". Repetition allows multiple instances of the section to be collected for a single instance of a document. This feature is used for smaller sets of repeating data, like the itemized list of charges on an invoice.

For example, the analyst may configure the data with the following documents, sections, and elements as part of a case profile called Notice of Loss: Auto.

Document Profile: Policy Details
  Section 1: Subscriber Information
    Element 1: Subscriber Name
    Element 2: Policy Number
    Element 3: Address Line 1
    Element 4: Address Line 2
    Element 5: City
    Element 6: State
    Element 7: Zip
  Section 2: Policy Information
    Element 1: Policy Number
    Element 2: Policy Name
    Element 3: Policy Excess Amount Sections can also be used to include data in a document that originally came from an external system. For instance, if it is necessary to run a rule against information for a customer that is only available on a mainframe, it's possible to retrieve that information from the mainframe, and make it a section in the case. This is accomplished by creating a special kind of section for a document, called an External Business Section. This type of section uses an EMS Business Services to gather its data. Since this type of section is generally used to look data up on an external system, these sections are designed so that they can provide information to be used to look up the data. This happens by defining a number of input parameters to the EMS Business Services to be run from other parts of the case. For instance, if an insured's details on a mainframe need to be looked up, the EMS Business Services would be provided with the insured's name, address, gender, or what ever information is needed to uniquely identify that person on the mainframe. The data that is returned from the mainframe is then mapped into the elements that have been defined for that section.

In one embodiment, the data returned is in a flat file format. In another embodiment, the data is in an XML format for easier manipulation by the system 100 and easier sharing of data across disparate branch offices running different legacy systems.

Rules

A rule package is a set of business rules organized into logical groupings that will be used for data collection by the Data Collection System and processing by the Process Control System for a particular KDT.

A rule package includes a scope, one or more rules and corresponding results, and an outcome. The scope defines the data available for rules to be defined and evaluated against. Rules have the following basic structure: If (condition) Then (child rules Or valid result) [Else (child rules Or valid result)]. Thus, each rule can have child rules and each rule package can have dependent rule packages to accommodate complex business scenarios.

There are two different types of rules: standard and inclusion rules. Each standard rule in the rule set is in the form of if-then-else format. The standard rules are defined as a condition or set of conditions that evaluate to a true or false value based on the specific information provided. Based on the value determined by the condition(s), the rule definition should indicate either to evaluate a set of child rules, or provide a result within the allowed values of the result set associated with the rule package in which the rule is being defined. The inclusion rules allow one rule package to simply include the results of another package. An inclusion rule does not have any conditions, but may be conditionally included in the results of the rule package if it is a child rule.

Result sets are used to define the possible outcomes of rules and how rule packages use those results in reaching an outcome or conclusion for the package. Result sets are separate from rule packages to separate the definition of possible results from the logic (rules) that determine the results. This provides the ability to control results for specific types of rule packages effectively, as well as have result sets shared across rule packages.

In the exemplary embodiment, there are five different types of result sets: 1. single conclusion, 2. compound conclusion, 3. binary, 4. score, and 5. action. During the result set definition, a set of allowed values for the result set are defined. For example, allowed values for a result set may include: "set document as required", "set document as optional", "set document as unavailable", "set element as required", "set element as optional", "set element unavailable", and "show prompt".

The outcome section receives the result set and by using a result set logic, produces one or more conclusions. The outcome section may further process the result set through one or more mathematical algorithms or simply pass the result set as its conclusion. In the exemplary embodiment, there are eight different algorithms or logics: priority, frequency, weighted, normal list, sum, average, minimum, and maximum.

The priority algorithm means the outcome of the rule package will be set to the conclusion of the highest ranked value that was the result of any rule. This algorithm enables logic to be created so that each single rule may affect the outcome of the entire rule package.

The frequency algorithm produces the conclusion that was the most frequent result of the collective set of rules.

The weighted algorithm produces a conclusion that is a function of both rank and frequency. The conclusions are counted as the rules are evaluated and are multiplied by their ranked value to determine a weight. The conclusion with the highest weight is the outcome of the package. If two conclusions have the same weight, the one with the highest rank will be the outcome of the package.

The normal list algorithm produces a list of conclusions that resulted from all rules with each conclusion appearing in the list one time at most. The list of all conclusions from all rules is normalized to remove unnecessary duplicates from the outcome of the rule package.

Other algorithms are standard mathematical functions that are self-explanatory.

In conventional rule processing systems, there are inference engines that arbitrate contradictory logic or rule collisions. As an example of a rule collision, assume that rule A is "if DamageCategory<$1000 then RepairType= Immediate", rule B is "if RepairType=Immediate then PoliceReport=Optional", and rule C is "if AccidentType= Personal_Injury then PoliceReport=Mandatory". If a claim to be processed as a customer transaction contains an AccidentType=Personal_Injury and a DamageCategory= $750, it is unclear whether a PoliceReport is Mandatory or Optional.

This type of conflict or collision is caused by the result of one rule forming the condition of another. This chaining of dependencies is complex and hard to test in a deterministic way. The problem with inference engines is that they allow introduction of inconsistent logic in a rule base (either on purpose or by accident) and the outcome is dependent on the inference algorithm.

The present invention, however, has a unique rule engine where no rule conditions are dependent upon the result of other rules, and no conventional inference engine is required to arbitrate contradictory logic or rule collisions. In a preferred embodiment, each rule package performs a single high level business decision. Within each rule package, all rules are treated equally, all rules are evaluated (regardless of preceding results), and it is the collective set of results that are then reviewed by the result set logic to present a deterministic outcome.

While rule chaining is not allowed in the embodiment shown, there are child rules and dependent rule packages as discussed above. They may appear to be similar to rule chaining but are not. Child rules are conditionally executed based upon the parent rule result and are a self-contained units that pass a deterministic result back up the tree. This is very much a structure for rule organization and abstraction management. Dependent rule packages assist with the re-use of business logic and again are self-contained units of business logic that can be nested into the overall business decision.

This type of modularization provides an important benefit of preventing rule collision such that a definite deterministic and non-inferential result is guaranteed for any rule package. It has the added benefit that it is easier to understand than a conventional large rule base and it correlates well with typical business logic.

In the exemplary embodiment, there are nine rule package types: case management, decision, section, element, document, complex validation, common, prerequisite and custom.

Three of the nine rule package types deal with data and data collection controlled by the Data Collection System: complex validation rule packages, element rule packages, and document rule packages.

Document rule packages are associated with one or more documents in the case profile. Document rule packages facilitate data collection by allowing data in some documents to make other documents or elements required, optional, or unavailable.

Element rule packages are associated with individual elements of data, and facilitate data collection by allowing one element to change the required/optional/unavailable status of other elements in the same document.

Complex Validation rules are attached to a document profile, and are used to verify that the data submitted for that document is valid. The result of these rules is either a "valid" or "invalid" judgment on the document. When a document is submitted that has an associated Complex Validation rule package, it is evaluated to determine if the document is logically valid (as defined by the rules in the package). One example is a validation rule that checks to see if the policy was in affect on the date of an incident.

Three of the nine rule packages deal with process step executions controlled by the Process Control System: case management, decision and section.

A case management rule package is used for the purpose of ensuring that all the information required for the processing of a specific case, as set by the scope of the rule package, is collected. The case management rule packages are utilized during the execution of a document requirements process step. The process step inherits the scope of the rule package to which it is associated. The case management rule package associated with the process step evaluates and returns an action result list as the result of the rule package. The actions in the list determine what actions will be taken on the any documents within the scope of the rule package.

A decision rule package is used in deciding what the next step in the process will be during the KDT. Once scope checking is performed during processing, the decision rule package associated with the process step evaluates and returns a result that represents a single decision. This outcome is mapped to a step transition that determines what next process step is executed.

A section rule package is similar to a decision rule packages in that they will make a decision on what the next step in the process will be during the KDT. The difference is that Section rule packages will provide a result for each of several similar "lines" of data (e.g., Invoice line items) within a document of a case. The results returned for each section will be used to determine the overall decision that is made.

A common rule package enables the construction of business specific logic of which the results will be used by a rule package of another type, or another common rule package. The common rule packages are only utilized as dependent rule packages when used by another rule package.

Prerequisite rule packages are used to conditionally evaluate individual rules in other rule packages. Prior to evaluating rules in a rule package, it is first determined which rules and versions of rules apply. This is accomplished by evaluating applicable prerequisite rule packages to determine which rules in the package apply. The prerequisite rule packages return a binary result of true or false to determine if the associated rule or rules should be evaluated.

Custom rule packages are created for a specific business purpose that cannot be met by any of the other rule package types.

Figure 5:
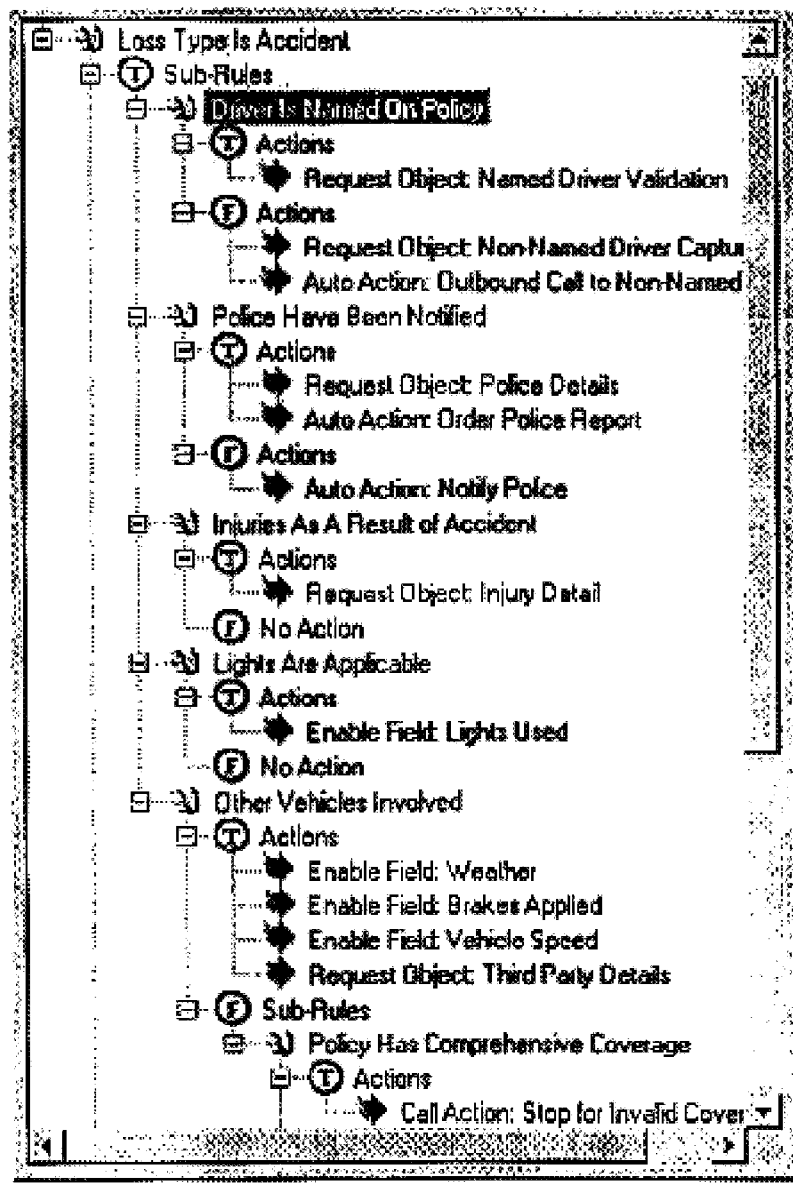
FIG. 5 illustrates an example of a graphical display of data collection rule packages of the present invention.
Figure 6:
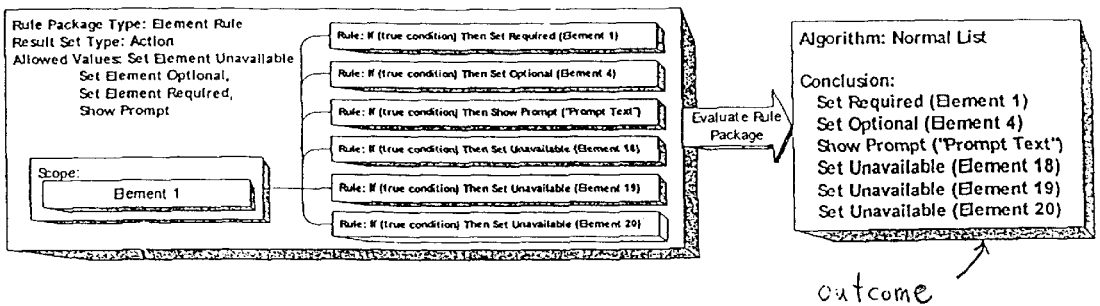
FIG. 6 illustrates an example of an element rule package of the present invention.

FIG. 5 illustrates an example of a graphical display of data collection rule packages by the rule builder. Rules are presented in a tree structure with True/False results that are easy to follow. FIG. 5 shows a data collection rule package called "Loss Type Is Accident". Under a True condition, that rule package includes a set of business rules: "Driver Is Named On Policy", "Police Have Been Notified", "Injuries As A Result of Accident", "Lights Are Applicable", "Other Vehicles Involved". In the "Driver Is Named On Policy" rule, if it evaluates to a True condition, then the conclusion is an Action called "Request Object: Named Driver Validation". If False (Else condition), then the conclusion is one Action called "Request Object: Non-Named Driver Capture" and another Action called "Auto Action: Outbound Call to Non-Named Driver". As can be appreciated by persons of ordinary skill in the art, such a graphical display allows an analyst with no programming experience to modify, add or delete any rule or action.

A detailed example of an element rule package is shown in FIG. 6. The result type is set to Action and allowed values for this rule package are "Set Element Unavailable", "Set Element Optional", "Set Element Required" and "Show Prompt". The scope is limited to Element 1 which means data from that single element is available for rules to evaluate against. Assuming that all the rules evaluate to a true condition, the results are "Set Required Element 1", "Set Optional Element 4", "Show Prompt 'Prompt Text'", "Set Unavailable Element 18", "Set Unavailable Element 19" and "Set Unavailable Element 19". In the outcome section, the result set logic or algorithm is set to Normal List. Accordingly, the conclusion includes one occurrence of all results in the result set. Although not shown, the program 114 according to the present invention allows the administrator building the rules to easily manipulate the rule packages through the use of scrollable windows, pull down menus, and drag and drop operations.

Figure 10:
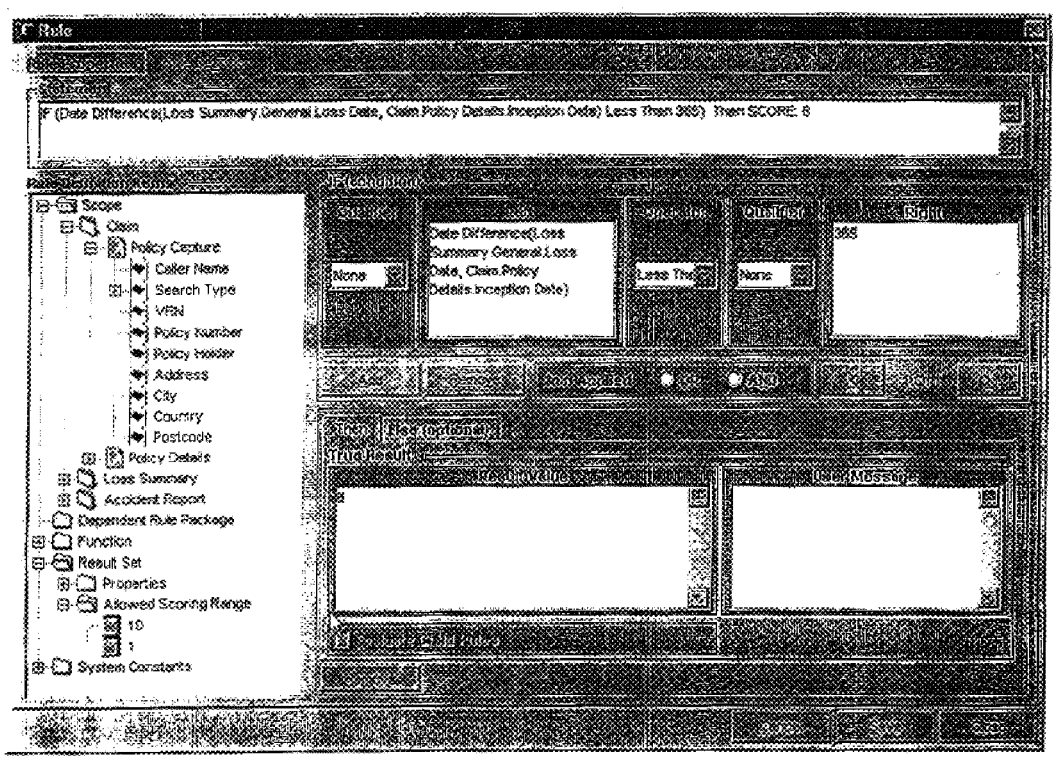
FIG. 10 is an exemplary screen shot of a rule builder according to the present invention.

FIG. 10 is an exemplary screen shot of a rule builder that illustrates how a user with no computer programming knowledge can build a rule with simple typing, mouse clicks, and drag and drop operations. The rule calculates a risk of an insurance policy holder. If the holder had the policy for less than 365 days before the accident occurred, then the rule assigns a relatively high risk score of 8. To build the rule, the user would simply click appropriate items and drop them into appropriate boxes. For example, the user can open the Function folder, click on the Date Difference Function and drag it into the If portion of the rule. The same can be done for the loss date and inception date by going to the Scope folder which contains all the data elements that are used for the rule package.

Processes

Once all data for a document have been collected, a process executed by the Process Control System takes that document through a series of steps, executing actions at each step, in order to achieve the final goal for the document (e.g., approval of payment on a claim).

To identify processes that need to be implemented, each document in the case should be considered for whether rules need to be applied to the document and whether the document needs to interact with a back end system.

Not all documents in the system will need a process run on them. For instance, support documents, such as a police report in an auto insurance claim context, may be involved in the rules and processing for a theft claim, but the theft claim is the only document that needs to be processed. Once processes are identified, process steps for each process is defined.

Each step in a process completes a business function and the results of each function determine the next step that will be executed in the process flow. There are seven different types of process steps, each of which provides the capability to perform a specific type of business function.

In the exemplary embodiment, there are seven types of process steps: case management, request and wait, section decision, business decision, service task, custom task, and manual resolution.

The case management step uses a rule package to determine additional documents and elements are needed for the case, based on the information already collected.

The request and wait step sends requests for document profiles that are required for the document being processed. Once requests have been issued, the process step enters a 'wait' state until the requested documents are submitted, or a timeout is reached.

The section decision step evaluates each section in a set of sections for the document, and stores the results of each evaluation. This is accomplished by running a section decision rule package.

The business decision step evaluates a decision rule package to determine the next transition to execute.

The service task step executes an EMS service to perform a defined task.

The custom task step executes a custom task using a plug-in that implements a standard interface.

The manual resolution step executes an EMS service to perform in order to route the document to an external workflow system. Once the service has been executed, the item waits until the document is resubmitted with a manual decision, or a timeout occurs.

Similar to the scope of the business rule package, every process step type except the request and wait step has a document scope. This scope is a list of documents that should be in a specified state for the step to be executed. The states that can be specified are: optional, complete and valid, complete only, and exists only.

For instance, if the step performs a business decision, the documents that are in the decision rule package scope should also appear in the process step's scope. There are automated means of guaranteeing that the minimum required scope for a step is set when the step is created. "Requested and Wait" steps do not have a document scope, since they are intended to request documents that will be needed to meet the scope of later steps.

Each process step has one or more transitions. A transition defines what happens to a document when it is finished with a process step. Transitions move a document from one process step to another, or handle error conditions. Any transition can be configured to delay the processing of a document for a period of time. This delay can be setup to occur from the current time or the document's creation time. The possible transitions from one process step to another depend upon the type of process step. There are standard transitions that should be defined for each type of process step.

Figure 7:
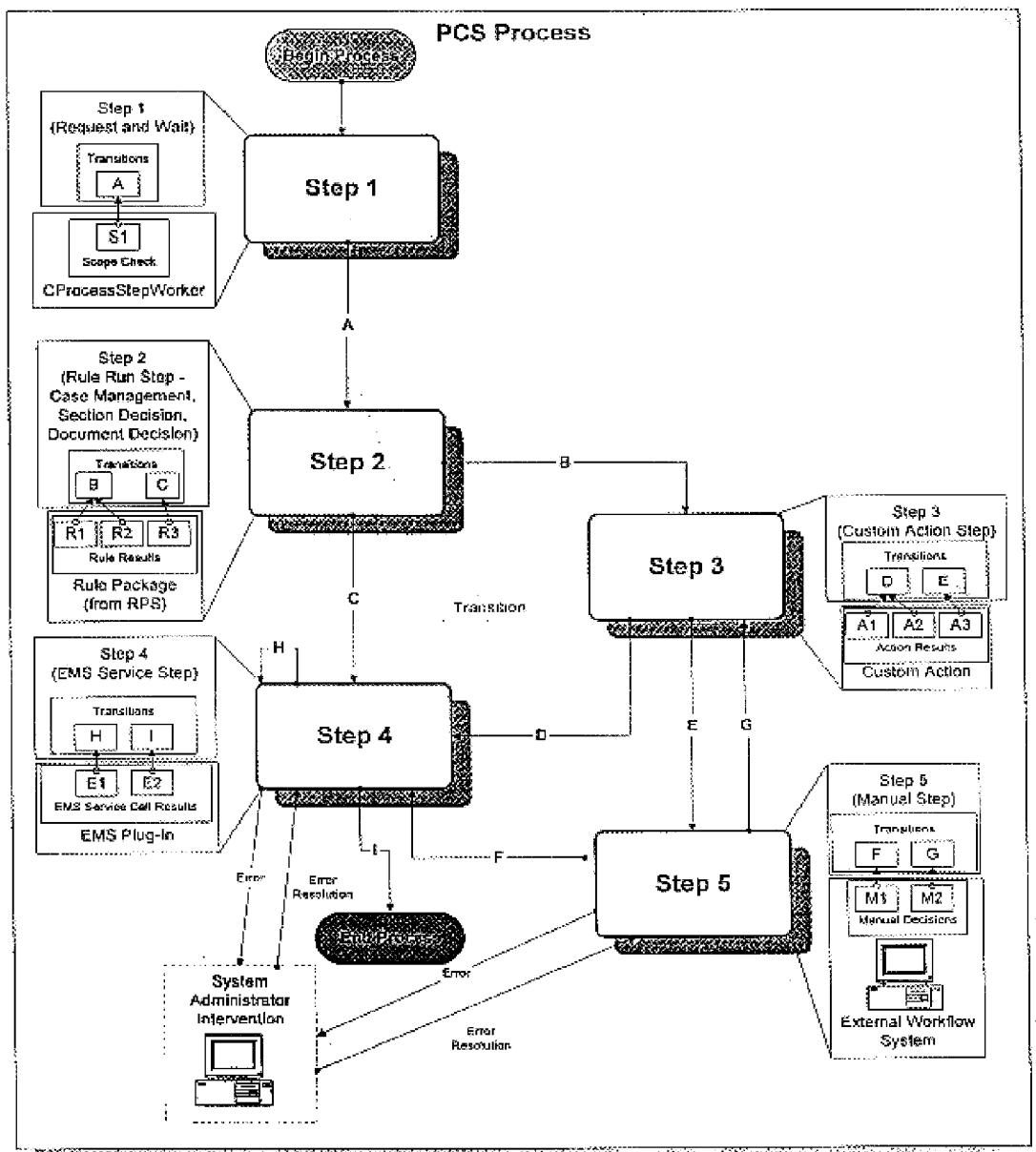
FIG. 7 is an example flow diagram of a process according to the present invention.

A sample process is shown in FIG. 7. Step 1 is a 'Request and Wait' step that looks at documents that are in the scope's step and determines if they are complete, incomplete, requested or not requested. Step 1 has one transition A. The result of the scope check is S1 (meaning scope complete), which is mapped to transition A. If the result of the scope check is S1, transition A will be triggered, which will send the document to Step 2.

Step 2 is a 'Rule Run' step. Case management, section decision and document decision step types are 'Rule Run' type steps where the associated Rule Processing System rule packages are executed. When the step is defined, the selected rule package's rule outcomes are mapped to the step's transitions. Step 2 has two transitions, B and C. The associated rule package has three rule outcomes, R1, R2, and R3. R1 and R2 are mapped to transition B and R3 is mapped to transition C. After the rule package runs, if the rule result is R1 or R2, transition B will be triggered which will send the document to Step 3. If rule result R3 is returned from the rule run, transition C will be triggered which will send the document to Step 4.

Step 3 is a 'Custom Task' step that executes a custom action plug-in component. When the step is defined, each of the values in a list that are associated with the component is mapped to the step's transitions. Step 3 has two transitions, D and E. The associated action has three outcomes, A1, A2, and A3. A1 and A2 are mapped to transition D and A3 is mapped to transition E. After the custom action runs, if the outcome is A1 or A2, transition D will be triggered which will send the document to Step 4. If outcome A3 is returned, transition E is triggered, which sends the document to Step 5.

Step 4 is a 'Service Task' step that executes an EMS Service to send data to an external system. When the step is defined, transitions are mapped to standard return codes from the execution of an EMS service. Step 4 has two transitions, H and I. The EMS service return codes are E1 and E2. After the EMS service call is made, if the return code is E1, transition H is triggered which will send the document back through the same step (for example, if the external system was unavailable, the step can be rerun). If the return code is E2, transition I will be triggered which will complete the process.

Step 5 is a 'Manual Resolution' step that sends the document to an external workflow system for review. When the step is defined, manual transitions are created which give the workflow user the choices of making a manual decision. When the user has corrected or completed the document, they return the document back to the Process Control System and send the document to a manual transition. Step 5 has two transitions, F and G. A reviewer chooses either F or G after the document has been reviewed or updated. If the reviewer chooses F, transition F will be triggered which will send the document to Step 4. If the reviewer chooses G, transition G will be triggered which will send the document to Step 3.

If an unexpected system error occurs in any step, a system administrator intervenes. Once the error is corrected, the administrator sends the case back to the process step where the error occurred.

Another flow diagram of a sample process that processes an auto accident claim will now be described with reference to FIG. 8 to further illustrate the benefits and novel features of the present invention.

Initially, a subscriber calls a call center to report an accident. Under the control of the DCS, an appropriate data collection scenario is selected and the dynamic Windows interface of the DIS displays prompts and instructions to assist a call center operator to collect the subscriber's identification and policy number. Alternatively, the present invention can use the DIS Dynamic Web Pages interface to collect information through the Internet without the assistance of a live operator. When the corresponding fields on the screen are populated, they are used to perform a search on an external system (e.g., an external database or mainframe) for the policy details through the EMS.

Still under the control of the DCS, the EMS returns the appropriate policy details from the external system and the details are displayed to the operator as the next page in the data collection scenario. In addition to the policy details being displayed, the operator is prompted to enter additional data such as description of the accident, time of day, cars involved, injuries, and witnesses.

Based on the data collected, rules associated with them are executed under the control of the Rules Processing System. Rule execution as part of the front-end drives the call to completion. As previously discussed, the rules are used to determine additional data required, the manner in which it is collected and how it is presented to the operator. For example if the operator indicates that injuries are involved in the accident being reported, then the transaction management program 114 through the RPS displays specific fields and prompts the operator to collect information about the injuries.

At times, rules will determine that a request be sent outside of the system to ask for the data from a third party. An example of this is a police report. The subscriber may indicate that police are involved. A rule executed not only presents to the operator some basic fields for collection of police information, but it may also send an automated action to the Process Control System to request the accident report from police headquarters. In the past, this would be an activity that the operator would manually perform. With the present invention, however, this activity is automated.

The data collection process continues until the operator has completed the collection scenario. Upon completion of collecting the data, the operator submits the claim.

Next, the claim is processed through a series of complex validation rule packages to determine whether the data collected is valid. If the rules detect a validation error, the operator is presented with the errors that were encountered and is prompted via prompt messages the actions to take in order to correct the errors presented, for example, to verify the incorrect information with the subscriber. Upon correction, the operator submits the claim again and the claim is sent to the Process Control System to process the back-end part of the transaction.

Figure 8:
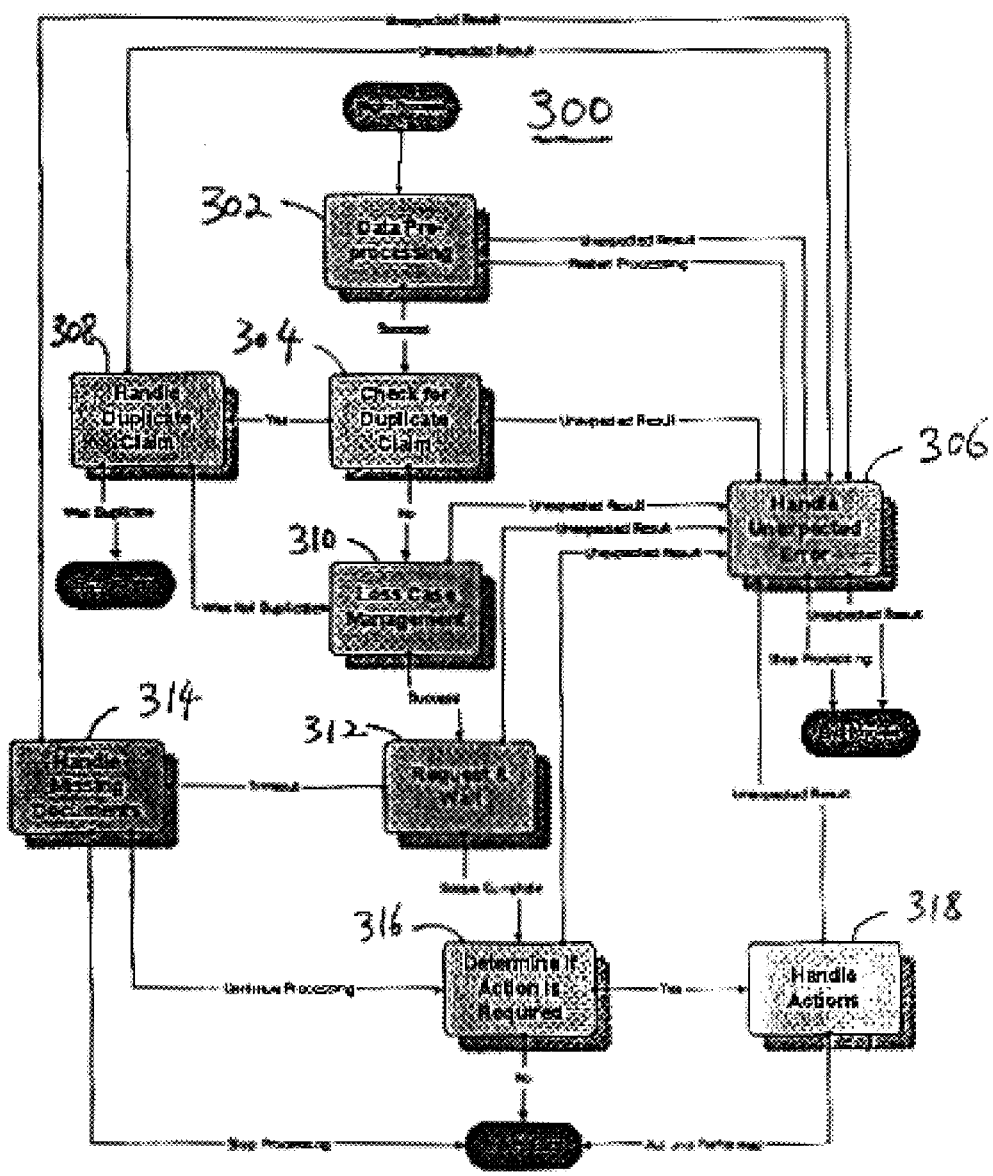
FIG. 8 is another example flow diagram of a process according to the present invention.

Under the control of the PCS, the claim is executed through a series of process steps as part of a claim process 300 shown in FIG. 8. In process step 302, a customer specific set of actions are executed to preprocess the claim. Typically, this would involve validating and manipulating the case data to ensure that further process steps will have data available in expected format. However, such a step could perform any task by creating a custom component. If unsuccessful, process step 306 is executed where unexpected errors are handled. This can be a manual resolution step requiring manual intervention by an operator or an automated step. Typically it is a manual resolution step that handles all transitions that are unexpected. Under certain circumstances, the claim can be sent back to step 302 to restart preprocessing.

If the result from step 302 is successful, on the other hand, process step 304 is executed. Step 304 is of a business decision type and therefore executes a decision rule package to check whether the claim is a duplicate. If the result is yes, then process step 308 is executed. Step 308 is typically a manual step where an operator manually determines whether the claim is in fact a duplicate. If it is, the process 300 is terminated. Otherwise, the operator sends the claim back into process flow (process step 310) for further processing.

Step 310 is also executed when the decision rule package in step 304 determines that the claim is not a duplicate. Step 310 is of a case management type and therefore executes a case management rule package to determine the additional information required to continue processing. For example, based on the data that have been processed thus far the rule package may determine that additional items or documents are required. This process step executes an associated rule package that determines the additional items or documents required and marks them as such in the case profile for further processing. An unexpected result from step 310 is handled by step 306. If, however, all required additional items are successfully identified and marked, process step 312 is executed.

Step 312 requests the additional items that have been marked by step 312 and enter into a wait state. If step 312 times out, process step 314 is executed. Similar to step 308, step 314 is typically a manual step where an operator manually determines whether the claim in fact does have all required items. If it does, the process 300 is terminated. Otherwise, the operator sends the claim back into process flow (process step 316) for further processing.

Step 316 is of a business decision type and therefore executes a decision rule package to check whether any automated or manual action is required. If no, claim processing is completed and the process 300 terminates normally. If yes, however, the routine 300 has determined that some type of additional action is required before the claim processing can be completed. If the required action is handled successfully, processing completes normally and the routine 300 terminates. Otherwise, step 306 is executed where unexpected errors are handled.

From the foregoing, it will be appreciated that, although specific embodiments of the invention have been described herein for purposes of illustration, various modifications may be made without deviating from the spirit and scope of the invention. For example, while the embodiment disclosed illustrates the present invention in an Internet environment, persons of ordinary skill in the art will appreciate that the system can be implemented in any computer network environment including the Intranet, LAN, WAN or the like. Accordingly, the present invention is not limited except as by the appended claims.

What is claimed is:

1. An automated knowledge dependent transaction management system for processing customer transactions, the system comprising:
   a storage device operable to store:
      data of a customer transaction,
      user-configurable business rule packages with each rule package having one or more business rules, each rule package having a deterministic outcome, at least some of the rule packages being associated with the data of the customer transaction, and user-configurable business process steps with at least one process step being associated with a rule package and operable to execute a task based on the deterministic outcome of the associated rule package; and
   a transaction management module operable to:
      collect a next data element of the customer transaction that depends on the deterministic outcome of the rule package associated with the data already collected, and
      process the customer transaction by executing the tasks of the process steps, a next process step to be executed being dependent on the execution result of a current business process step.

2. The system according to claim 1, further comprising a rule builder that displays a graphical representation of a business rule and allows a business administrator to graphically change the business rule without using any computer programming code.

3. The system according to claim 2 wherein the rule builder displays the plurality of rule packages in a tree structure.

4. The system according to claim 1, further comprising a process builder that displays a graphical representation of the process steps and allows a business administrator to graphically change the process steps without using any computer programming code.

5. The system according to claim 4 wherein the process builder displays the process steps in a flow chart format.

6. The system according to claim 1, further comprising:
   an external mapping module operable to retrieve data resident on an external system which are requested by the transaction management module according to the outcomes of the rule packages or process steps.

7. The system according to claim 6 wherein the data stored in the storage device contains an external business portion that stores information regarding what data is to be passed to the external mapping module to retrieve the requested data resident on the external system.

8. The system according to claim 6 wherein the external mapping module receives the requested data resident on the external system in an XML format.

9. The system according to claim 1, further comprising:
   a dynamic user interface module operable to dynamically change the display to guide either a data collector or the customer as to how to provide the data being collected, the dynamic change of the display being dependent on the outcomes of the rule packages or process steps.

10. The system according to claim 1 wherein the data of the customer transaction includes a case profile that defines the data to be collected to process the customer transaction.

11. The system according to claim 1 wherein each rule in the rule package is in the form of if-then logic.

12. The system according to claim 11 wherein the rule package is associated with a first data item and evaluation of the associated rule package determines whether another data item is required or optional.

13. The system according to claim 11 wherein the if portion of the rule in the rule package is capable of incorporating the outcome of another rule package.

14. The system according to claim 1 wherein each rule package includes a result set and a result set logic, and wherein the deterministic outcome is based on evaluation of the result set logic.

15. The system according to claim 14, wherein the rules are nested such that one rule includes a child business rule package to be evaluated.

16. The system according to claim 1 wherein the at least one process step includes one or more transitions to other process steps according to the evaluation of the rule package associated with the at least one process step.

17. The system according to claim 1 wherein the data, rule packages and process steps are stored in the storage device in an XML format.

18. The system according to claim 1, wherein:
a data element has an associated status of required or optional; and
when the data element is collected, an associated rule package is capable of changing the status of another data element to required or optional.

19. The system according to claim 1, wherein:
a data element has an associated status of unavailable, required or optional; and
when the data element is collected, an associated rule package is capable of changing the status of another data element to unavailable, required or optional.

20. The system according to claim 1, wherein when a data element is collected, an associated rule package is executed.

21. The system according to claim 1, wherein:
the customer transaction data includes a document and the document has an associated status of exists, complete, or complete and valid; and
when data contained in the document is received, a validation rule package associated with the document is executed.

22. An automated knowledge dependent transaction management system for processing customer transactions, the system comprising:
a storage device operable to store:
data of a customer transaction,
user-configurable business rule packages with each rule package having one or more business rules, wherein at least some of the rule packages are associated with the customer transaction data, each rule package having a deterministic outcome, and
user-configurable business process steps with at least some process steps being associated with the rule packages,
a builder module that allows a business administrator to graphically change the rule packages and process steps; and
a transaction management module operable to:
collect the customer transaction data according to the evaluation of the associated rule packages, and
process the customer transaction data by executing the tasks of the process steps, a next process step to be executed being dependent on the execution result of a rule package associated with a current business process step.

23. The system according to claim 22 wherein the transaction management module collects a next data element of the customer transaction that depends on a deterministic outcome of the rule package associated with the data already collected.

24. The system according to claim 22 wherein the builder module displays a graphical representation of the rule packages and process steps for manipulation by the business administrator without using any computer programming code.

25. The system according to claim 22 wherein each rule package includes a result set and a result set logic, and wherein a deterministic outcome of the rule package is based on evaluation of the result set logic.

26. The system according to claim 22 wherein each of the some process steps includes one or more transitions to other process steps according to the evaluation of the rule package associated with the each process step.

27. An automated knowledge dependent transaction management system for processing customer transactions, the system comprising:
a storage device operable to store:
data of a customer transaction,
user-configurable business rule packages with each rule package having one or more business rules, each rule package having a deterministic outcome, and
user-configurable business process steps with at least one process step being associated with a rule package and operable to execute a task based on the deterministic outcome of the associated rule package; and
a transaction management module operable to process the customer transaction data by executing the tasks of the process steps, a next process step to be executed being dependent on the execution result of a rule package associated with a current business process step.

28. The system according to 27, were the transaction management module is further operable to collect a next data element of the customer transaction that depends on the deterministic outcome of the rule package associated with the data already collected.

29. The system according to claim 27, wherein the transaction management module is further operable to determine the next process step of the customer transaction which depends on the deterministic outcome of the rule package associated with the data already collected.

30. The system according to claim 27, further comprising a rule builder that displays a graphical representation of a business rule and allows a business administrator to graphically change the business rule without using any computer programming code.

31. The system according to claim 27, further comprising a process builder that displays a graphical representation of the process steps and allows a business administrator to graphically change the process steps without using any computer programming code.

32. The system according to claim 27, wherein each rule package includes a result set and a result set logic, and wherein the deterministic outcome is based on evaluation of the result set logic.

33. The system according to claim 32, wherein the rules are nested such that one rule includes a child business rule package.

34. The system according to claim 27, further comprising a data control system (DCS) builder that graphically allows a business administrator to establish document profiles, sections and elements of the customer transaction data.

* * * * *